United States Patent
Wei

(10) Patent No.: US 7,084,607 B2
(45) Date of Patent: Aug. 1, 2006

(54) BATTERY CHARGER HAVING FIXED ENDS FOR WINDING AND RELEASING WIRES

(76) Inventor: Jose Wei, No. 17-2, Pai Ling 1$^{st}$ Rd., Hsin Tien City, Taipei Hsien (TW)

( * ) Notice: Subject to any disclaimer, the term of this patent is extended or adjusted under 35 U.S.C. 154(b) by 495 days.

(21) Appl. No.: 10/421,889

(22) Filed: Apr. 24, 2003

(65) Prior Publication Data
US 2004/0160211 A1 Aug. 19, 2004

(30) Foreign Application Priority Data
Feb. 18, 2003 (TW) .................................. 92202526 U

(51) Int. Cl.
*H02J 7/02* (2006.01)

(52) U.S. Cl. ..................................... 320/111; 242/400.1
(58) Field of Classification Search ................. 320/107, 320/111, 114, 115; 242/160.2, 166, 177, 327, 242/361.4, 400.1, 405.1
See application file for complete search history.

(56) References Cited

U.S. PATENT DOCUMENTS 5,684,883 A * 11/1997 Chen ........................... 381/385
6,059,081 A * 5/2000 Patterson et al. ...... 191/12.2 R
6,402,546 B1 * 6/2002 Groves et al. .............. 439/501
6,434,249 B1 * 8/2002 Wei ............................. 381/370

* cited by examiner

*Primary Examiner*—Edward H. Tso
(74) *Attorney, Agent, or Firm*—Dennison, Schultz, Dougherty & MacDonald

(57) ABSTRACT

A battery charger having fixed ends for winding and releasing wires includes a box; an immovable axis provided at an inner wall of the box; a large turning wheel having a larger diameter and a small turning wheel having a smaller diameter disposed next to the large turning wheel, wherein the large and small turning wheels have a same center orifice flexibly connected into the immovable axis; and a wire having one end thereof penetrated through a through hole provided at the inner wall and further connected to the circuit board and winded in the large and small wire storage grooves. A wire is efficiently collected in the box, and thus making the wire of the battery charger spaceless for ready storage.

6 Claims, 7 Drawing Sheets

BATTERY CHARGER HAVING FIXED ENDS FOR WINDING AND RELEASING WIRES

BACKGROUND OF THE INVENTION (a) Field of the Invention

The invention relates to a battery charger having fixed ends for winding and releasing wires, and more particularly, to a battery charger disposed with coaxial wire winding turning wheels having different diameters at the interior thereof for collecting and releasing wires of the battery charger.

(b) Description of the Prior Art

Battery chargers of common electric appliances generally have long signals wires that cannot be collected into the interior of the battery charger, and thus take up quite large spaces as well as being too bulky for packaging or storage.

A typical structure of a prior wire winding device in a battery charger, as disclosed by the Taiwan Patent Publication No. 468887 "Readily Portable and Wire Winding Device for Cellular Phone Chargers" for instance, the wire winding thereof is manually operated using a rotational base that simultaneously rotates a rotational wire winding disk thereof for accomplishing the purpose of winding the wire of the battery charger.

It is observed from the above invention that the process of wire winding appears somewhat cumbersome and inconvenient for that the hand of a user is used for rotating the base thereof.

According to the "Earphone Wire Winding Box with Coaxial and Dual Wheels" as disclosed by the inventor hereby in the U.S. Pat. No. 6,434,249B1, a same axis 30 and turning wheels 10 and 20 having different diameters are utilized, such that when a signal wire S stored in the large turning wheel 10 is pulled out, a lower wire S4 stored in a storage groove 25 of the small turning wheel 20 lowers by a rather short distance. Although the invention is indeed quite practical, the implementations thereof yet are limited to earphone wire winding boxes.

In the view of the above, in order to efficiently control wires of a battery charger such that the wires thereof are hidden when winded and left undamaged when released, it is a vital task of the invention as how to combine a wire releasing and winding structure having coaxial and dual wheels with components of a battery charger.

SUMMARY OF THE INVENTION

Therefore, an object of the invention is to provide a battery charger having fixed ends for winding and releasing wires so as to efficiently wind the wires into a box of the battery charger, thereby having the wires of the battery charger as spaceless and also being ready for packaging and storage.

The other object of the invention is to provide a battery charger having fixed ends for winding and releasing wires so as to prevent conductive joints at the lower ends of the wires from displacing or falling of during winding or releasing processes of the wires.

DETAILED DESCRIPTION OF THE PREFERRED EMBODIMENTS

Figure 1:
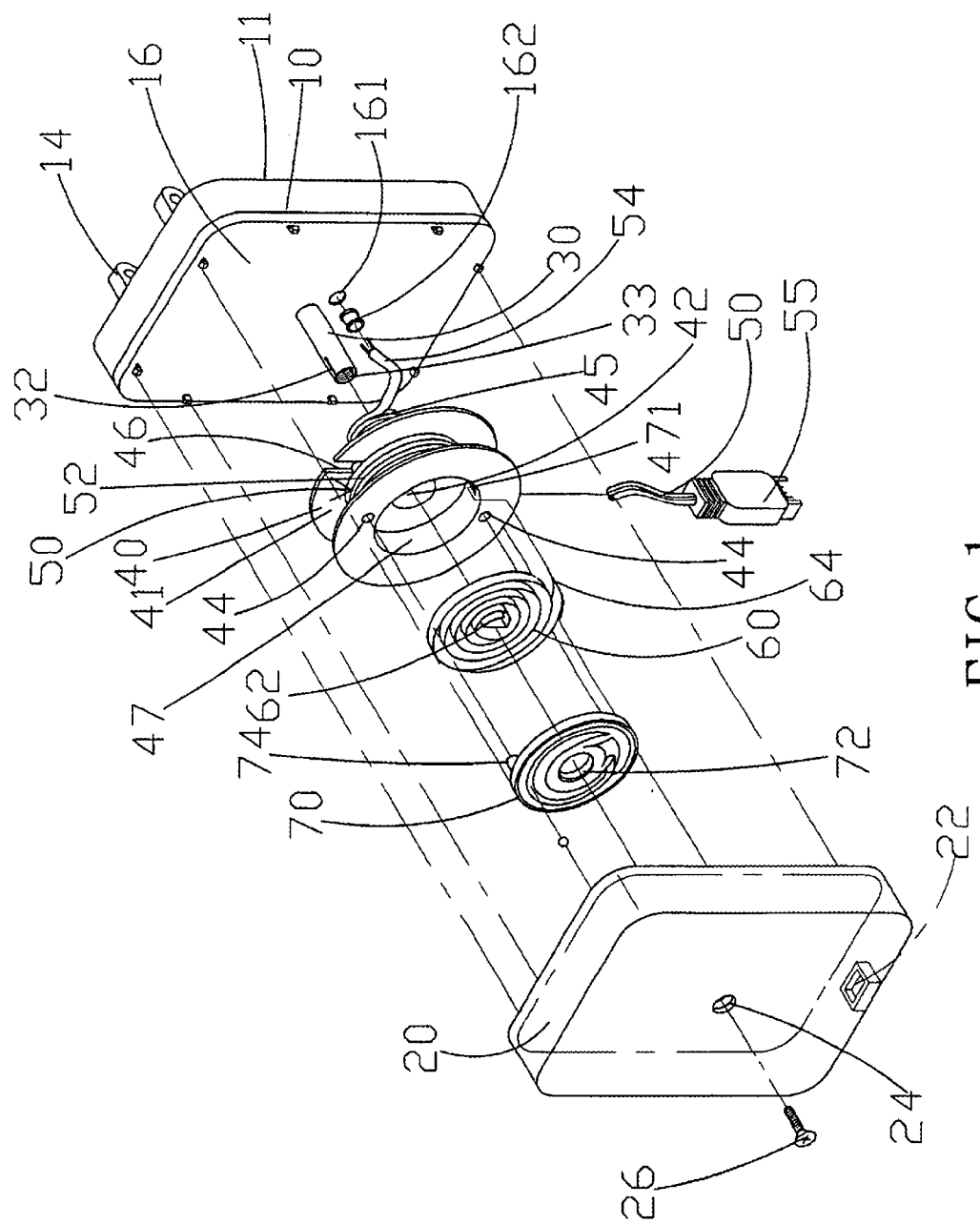
FIG. 1 shows an exploded elevational view according to the invention.
Figure 2:
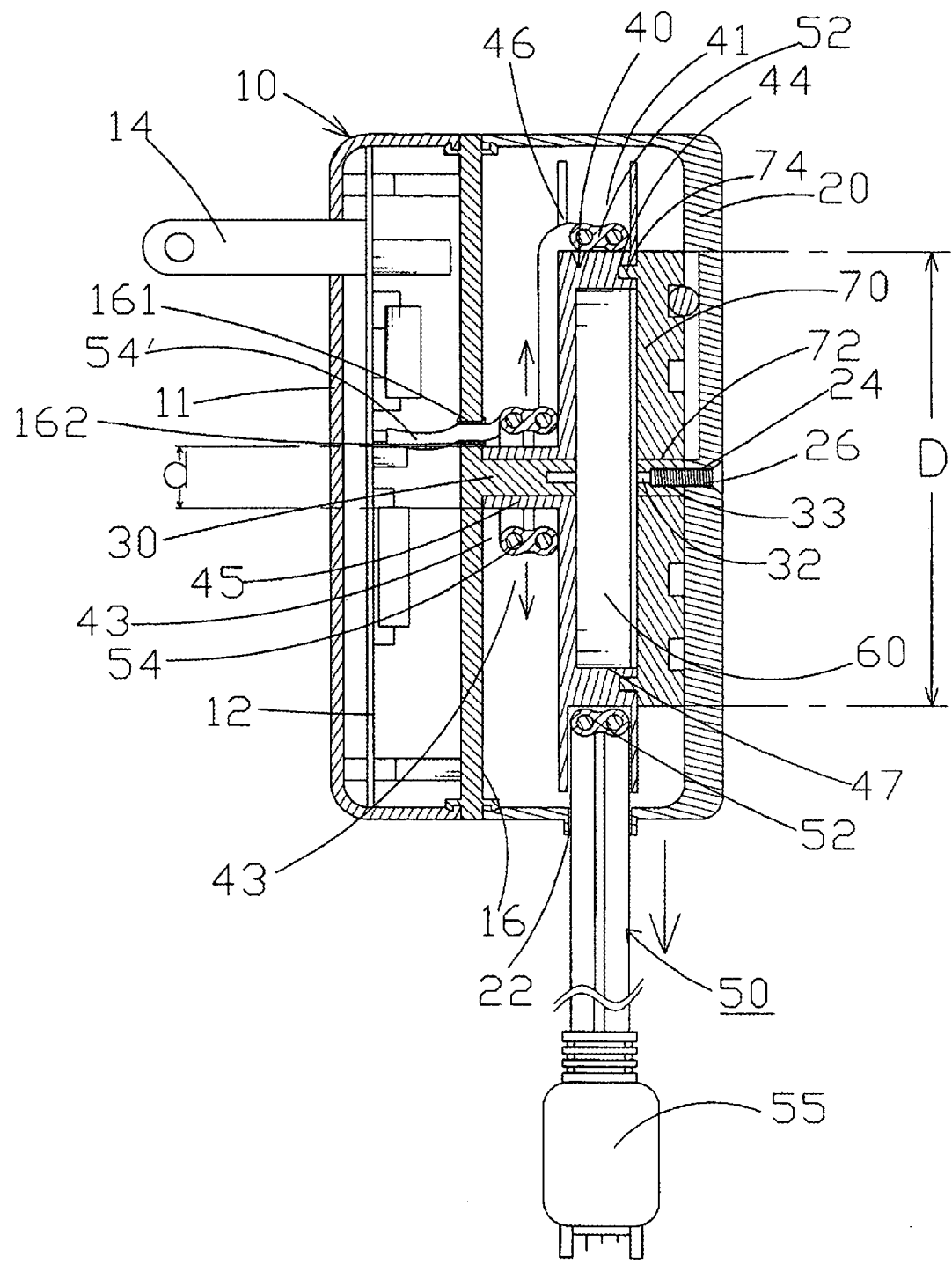
FIG. 2 shows a sectional view illustrating the wire being pulled out of the box according to the invention.

Referring to FIGS. 1 and 2, the invention is characterized by:

an box 10 comprising a circuit board 12 at the interior thereof, and a power plug 14 extended along and penetrated through an outer wall 11 thereof;

an outer housing 20 provided with a guiding orifice 22 and combined to the box 10;

a protruding and immovable axis 30 and a through hole 161 provided at an inner wall 16 of the box 10;

a large turning wheel 40 having a larger diameter D, and a small turning wheel 45 having a smaller diameter d disposed next to the large turning wheel 40, wherein the large and small turning wheels 40 and 45 have a same center orifice 42 flexibly connected into the immovable axis 30, so that the large and small turning wheels 40 and 45 rotate with elasticity regarding the center orifice 42 as the center of rotation thereof; large and small wire storage grooves 41 and 43 formed at the wheel planes of the large and small turning wheels 40 and 45; and a wedging slot 46 disposed at a lateral side of the wheel plane of the large turning wheel 40; and a wire 50 having one end thereof penetrated through a through hole 161 provided at the inner wall 16 and further connected to the circuit board 12 and the other end thereof being a terminal plug 55, and winded in the large and small wire storage grooves 41 and 43, wherein an appropriate position of the wire 50 is placed and wedged in the wedging slot 46 for forming inner and outer wires 54 and 52, respectively.

According to the aforesaid primary characteristics, wherein a side recess 47 of the large turning wheel 40 is fastened and connected to a spring 60 having an inner end 62 placed and wedged in a wedging slot 32 of the immovable axis 30 and an outer end 64 placed and wedged in a wedging slot 471 provided in advance at the wall of the side recess 47.

According to the aforesaid primary characteristics, wherein an anti-slide sheath 162 is accommodated in the through hole 161 provided at the outer wall 16 of the box 10, and the inner wire 54 is tightened and positioned in the opening of the anti-slide sheath 162 (as shown in FIG. 2).

According to the aforesaid primary characteristics, wherein one end of the immovable axis 30 is flexibly connected to a ring connector 70 having a center orifice 72 and a bolt 74. The bolt 74 is inserted into a hole 44 disposed at the outer sidewall of the large turning wheel 40, the center orifice 72 is being penetrated through to flexibly connect to the immovable axis 30, and the ring connector 70 is combined to the outer sidewall of the large turning wheel 40.

According to the aforesaid primary characteristics, wherein the outer housing is disposed with a pivotal opening 24 at the center thereof, and a screw bolt 26 is inserted and connected into the pivotal opening 24 and a screw opening 33 provided in advance at the front end of the immovable axis 30.

Figure 5:
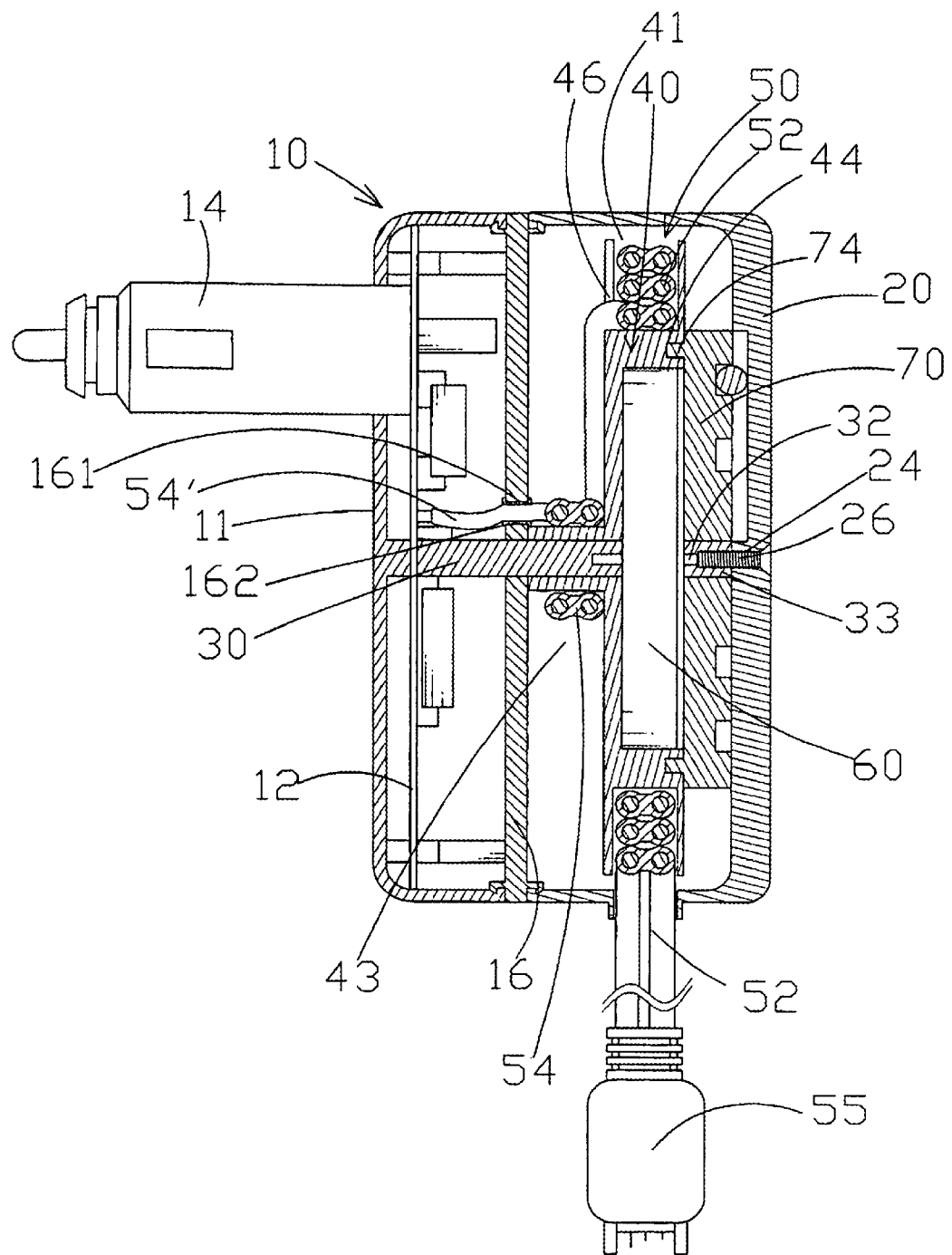
FIG. 5 shows a sectional view of yet another embodiment according to the invention.
Figure 7:
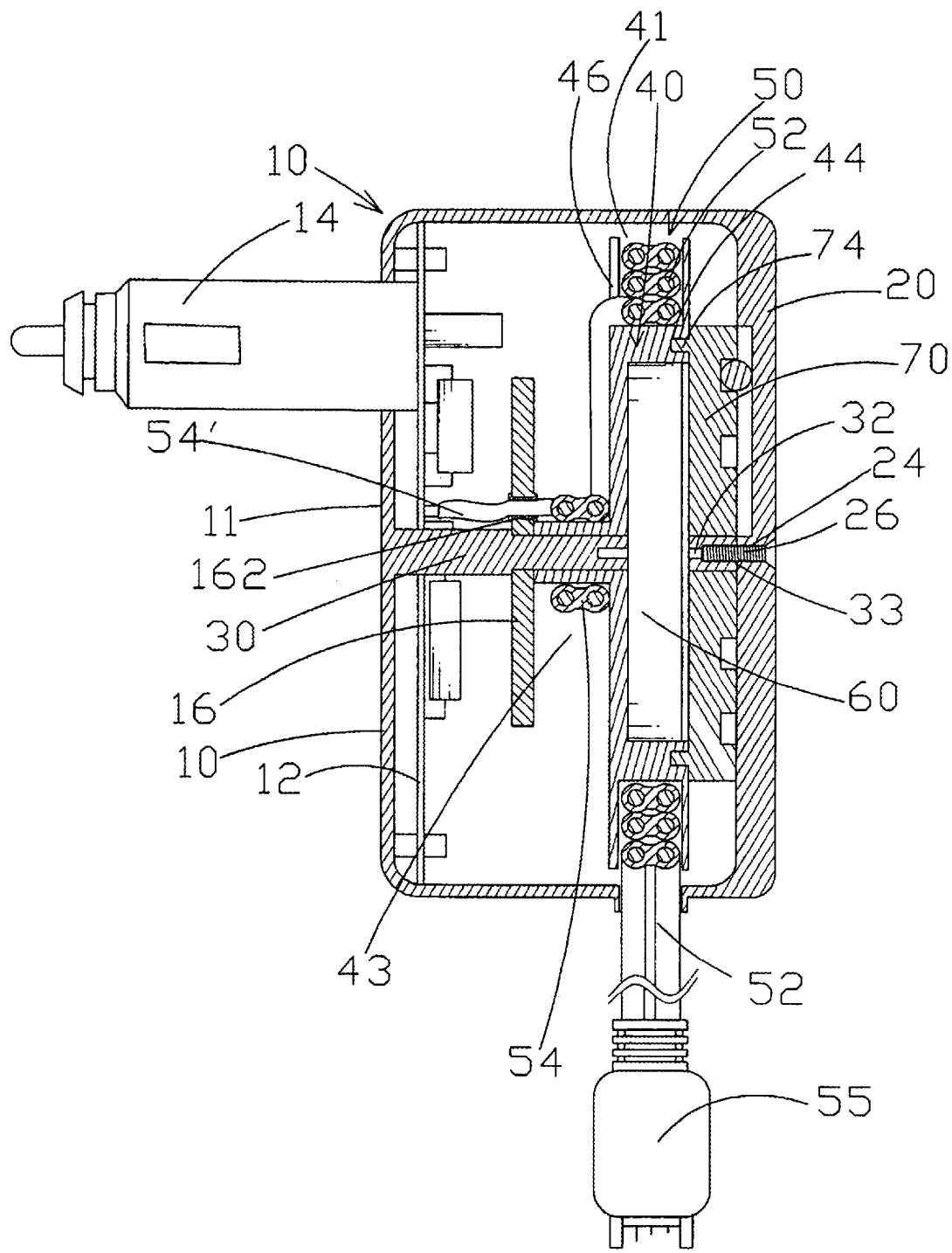
FIG. 7 shows a sectional view of yet another embodiment according to the invention.

According to the aforesaid primary characteristics, wherein the back end of the immovable axis 30 is extended to the outer wall 11 in a longitudinal direction and combined with the outer wall 11 into one body, and the inner wall 16 is a ring-shaped with the outer periphery thereof disjointed from the sidewalls of the box 10 (as shown in FIGS. 5 and 7).

To better understand the invention, descriptions shall be given with the accompanying drawings below.

Figure 6:
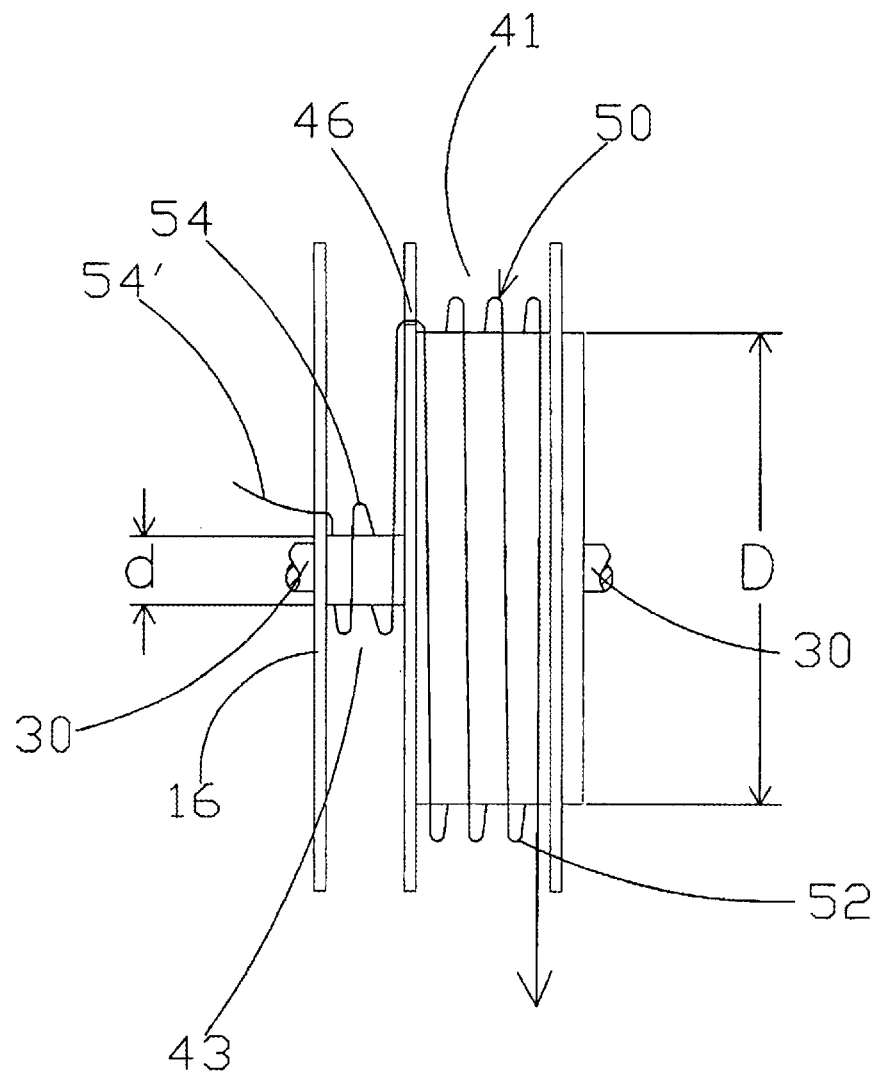
FIG. 6 shows a side schematic view of the large and small turning wheels storing the wire according to the invention.

1. Referring to FIGS. 1 and 2, the wire 50 stored in the large wire storage groove 41 is defined as the outer wire 52 and the wire 50 stored in the small wire storage groove 43 is defined as the small inner wire 54. The inner and outer wires 54 and 52 are placed and wedged in the wedging slot 46 with a positioned partition; that is, a first fixed end of the wire 350 is formed at the location of the wedging slot 46, and a second fixed end is of the wire 50 is formed where the inner wire 54 is being fastened by the anti-slide sheath 162 at the inner wall 16. When the hand of a user pulls the terminal plug 55 outward, the outer wire 52 is guided to the exterior through the guiding orifice 22, and the large and small turning wheels 40 and 45 are rotated regarding the immovable axis 30 as the center of rotation thereof. For one revolution made by the large turning wheel 40, the released (or winded) length of the outer wire 52 in the large wire storage groove 41 is π×D, where D is the diameter of the large turning wheel 40. Similarly, for one revolution made by the small turning wheel 45, the released (or winded) length of the inner wire 54 in the small wire storage groove 43 is π×d, where d is the diameter of the small turning wheel 45. As a result, when the large and small turning wheels 40 and 45 rotate coaxially, the ratio of the lengths the inner and outer wires 54 and 52 released or winded equals to the ratio of the large and small turning wheels 40 and 45; that is to say, D:d. In a preferred embodiment according to the invention, suppose the diameter ratio of the large and small turning wheels 40 and 45 is 10:1, the length of the inner wire 54 released is 10 cm when the length of the outer wire 52 released is 100 cm. For the reason that a fixed end is formed from the tightening of the anti-slide sheath 162 around the inner wire 54, the inner wire 54 shows a lax state in the small wire storage groove 43 when it is released from the small wire storage groove 43, and hence displacement of the inner wire 54' in the box 10 is considered as non-existent. Referring to FIG. 6, the larger the diameter ratio (D:d) of the large and small turning wheels 40 and 45 is (meaning the smaller the diameter of the small turning wheels gets), the less the length of the inner wire 54 released from the small wire storage groove 43 becomes. Consequently, the lax state of the inner wire 54 produced in the small wire storage groove 43 is far less too drastic to cause a mess of the wire. When the outer wire 52 is released to the limit thereof, the inner wire 52 is not released or displaced along with the outer wire 52 due to the positioning of the wire by the wedging slot 46.

2. Referring to FIG. 2, the conductive metal wire at rear end of the inner wire 54' at the interior of the box 10 is connected with the circuit board 12 by means of welding or terminal insertions for forming a conductive joint. At this point, another fixed end of the inner wire 54' is formed due to the tightening of the anti-slide sheath 162, and therefore the inner wire 54' remains immovable. To be more specific, displacements of the inner wire 54' in the box 10 are not caused when releasing (or winding) the inner wire 54 from the small wire storage groove 43.

Figure 3:
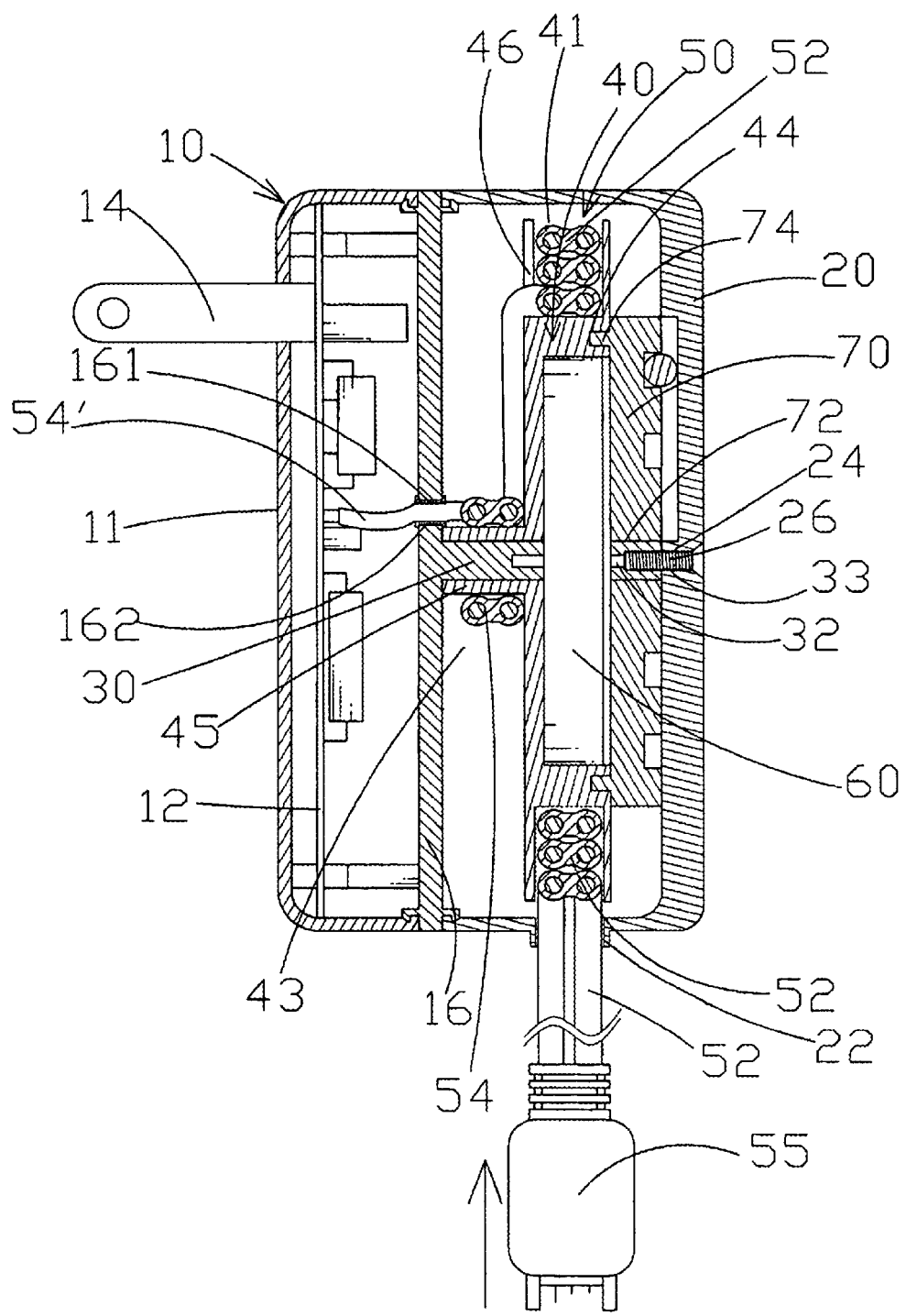
FIG. 3 shows a sectional view illustrating the wire winding according to the invention.

3. Referring to FIG. 3 showing a sectional view illustrating the winding process, wherein elastic rotations of the large and small turning wheels 40 and 45 are accomplished through the spring 60. Because that the inner end 62 of the spring 60 is fastened to the immovable axis 30 and the outer end 64 is fastened in the side recess 47, when the pulling force of the outer wire 52 being pulled out is dismissed, the contraction force of the spring 60 may be utilized for rotating the large and small turning wheels 40 and 45 in a reverse direction in order to wind the outer wire 52 back into the large wire storage groove 41. The lax inner wire 54 is subsequently winded in a reverse direction to restore back to a tightened state, thereby quickly completing the winding process. At this point, the terminal plug (socket) 55 is fasted at the outer periphery of the guiding orifice 22, so as to hide the wire 50 of the electric appliance within the outer housing 20. In addition, the ring connector 70 covers the outer edge of the spring 60 for preventing displacements of the spring 60.

Figure 4:
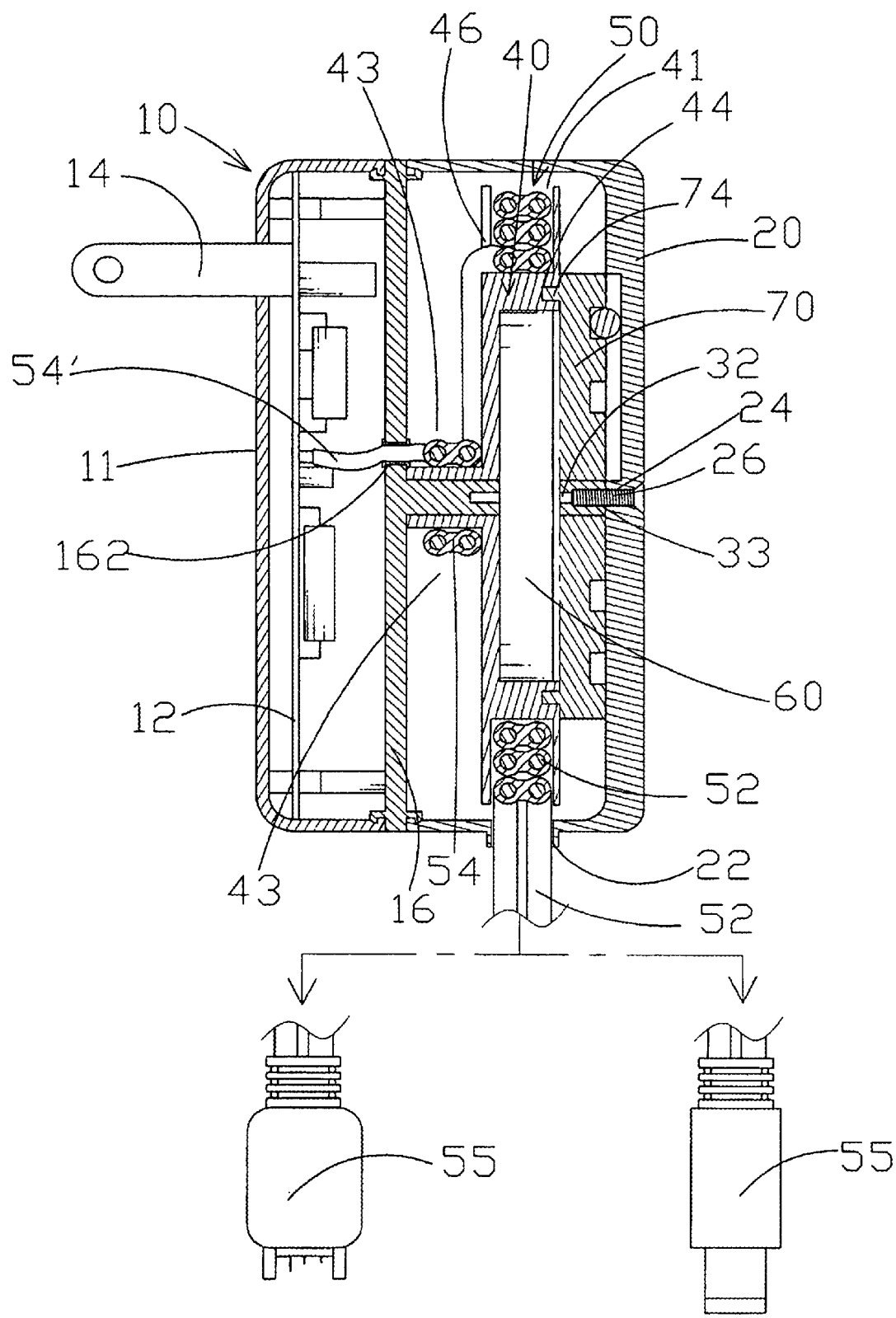
FIG. 4 shows the plug of the wire in another embodiment according to the invention.

4. Referring to FIG. 5 showing another embodiment according to the invention, the immovable axis 30 may also be extended upward from the interior of the outer wall 11 of the box 10 such that the immovable axis 30 is penetrated through the circuit board 20 and the inner wall 16 to fasten to the outer housing 20. Referring to FIGS. 2 and 3, to increase the stress intensity of the immovable axis 30, the screw bolt 26 is connected into the screw opening 33 of the immovable axis 30 through the pivotal opening 24 of the outer housing 20. Referring to FIG. 4, to make adaptations to various electric appliances, the terminal plug 55 connected at the outer end of the outer wire 52 may be different forms of plugs or sockets. The power plug 14 may also be implemented as column-shaped to coordinate with power sockets of vehicles. Referring to FIG. 7, after the outer housing 20 and the box 10 are combined into one body, the inner wall 16 may be formed as discontinuous in shaped, that is, the inner wall 16 is circular in shape with the outer periphery thereof disjointed with the sidewalls of the box 10, as well as being fastened to the immovable axis 30. Through this embodiment, the invention may similarly wind and release the wire 50.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A battery charger having fixed ends for winding and releasing wires comprising:

a box comprising a circuit board at the interior thereof, and a power plug extended along and penetrated through an outer wall thereof;

an outer housing provided with a guiding orifice and combined to the box;

a protruding and immovable axis and a through hole provided at an inner wall of the box;

a large turning wheel having a larger diameter and a small turning wheel having a smaller diameter disposed next to the large turning wheel, wherein the large and small turning wheels have a same center orifice flexibly connected into a immovable axis, so that the large and small turning wheels rotate with elasticity regarding the center orifice as the center of rotation thereof; large and small wire storage grooves formed at the wheel planes of the large and small turning wheels; and a wedging slot disposed at a lateral side of the wheel plane of the large turning wheel; and a wire having one end thereof penetrated through the through hole provided at the inner wall and further connected to the circuit board and the other end thereof being a terminal plug, and winded in the large and small wire storage grooves, wherein an appropriate position of the wire is placed and wedged in the wedging slot for forming inner and outer wires.

2. A battery charger having fixed ends for winding and releasing wires in accordance with claim 1, wherein a side recess of the large turning wheel is fastened and connected to a spring having an inner end placed and wedged in a wedging slot of the immovable axis and an outer end placed and wedged in a wedging slot provided in advance at the wall of the side recess.

3. A battery charger having fixed ends for winding and releasing wires in accordance with claim 1, wherein an anti-slide sheath is accommodated in the through hole provided at the outer wall of the box, and the inner wire is tightened and positioned in the opening of the anti-slide sheath.

4. A battery charger having fixed ends for winding and releasing wires in accordance with claim 1, wherein one end of the axis is flexibly connected to a ring connector having a center orifice and a bolt; and the bolt is inserted into a hole disposed at the outer sidewall of the large turning wheel, the center orifice is being penetrated through to flexibly connect to the immovable axis, and the ring connector is combined to the outer sidewall of the large turning wheel.

5. A battery charger having fixed ends for winding and releasing wires in accordance with claim 1, wherein the outer housing is disposed with a pivotal opening at the center thereof, and a screw bolt is inserted and connected into the pivotal opening and a screw opening provided in advance at the front end of the immovable axis.

6. A battery charger having fixed ends for winding and releasing wires in accordance with claim 1, wherein the back end of the immovable axis is extended to the outer wall in a longitudinal direction and combined with the outer wall into one body, and the inner wall is a ring-shaped with the outer periphery disjointed from the sidewalks of the box.

* * * * *